Patented Sept. 17, 1935

2,014,761

UNITED STATES PATENT OFFICE 2,014,761

PROCESS FOR THE MANUFACTURE OF SOLUTIONS FROM CELLULOSE

Otto Faust, Rorschach, Switzerland, assignor of one-half to Zellstofffabrik Waldhof, Mannheim-Waldhof, Germany, a German company No Drawing. Application October 29, 1930, Serial No. 492,103. In Germany December 5, 1929

2 Claims. (Cl. 260—10)

For the production of cellulose solutions hitherto use has been made exclusively of cotton, cotton-lint or cellular sulphite substances. The sulphate or soda cellular substance or cellulose so highly esteemed for many substances has hitherto not been suitable for solutions.

Now it has been found that the reason for the uselessness of the said soda or sulphate substances for the manufacture of solutions from cellulose or cellulose compositions is attributable to the lack of uniformity in the composition of these cellular substances, which is due to the fact that for the soda cellular substances of the commercial type there are used as initial raw material, only mixtures of different kinds of wood, preferably of pine and fir types. This lack of uniformity in the composition of the substance gives rise to a varying behaviour of the different fibrous ingredients of the substance in relation to the chemical reactions, from which there then results imperfect solution, bad filtration and inferior final products.

Experiments have shown that alkali treated celluloses can also be advantageously used for making solutions provided the raw wood material used as a basis be of a perfect uniform nature, say for example a well-barked fir-wood which is then worked up into a good bleachable cellular substance or cellulose in the manner already known. Furthermore, when preparing the wood and also in the preparation of the solutions the usual procedure may be observed. In this way there is also obtained from the soda or sulphate cellulose solutions, for example copper-oxide ammonia cellulose, viscose or cellulose acetate, which may be regarded as of equal value when compared with those obtained from sulphite cellulose.

The new process can, for example, be carried out in the following manner:—

The wood intended for producing the substance is carefully sorted, so that, for example, only pure pine or only pure fir-wood is used. The pure type of wood thus obtained is (when well-barked and disintegrated) boiled with a 5-per cent sodium hydroxide solution for from twelve to fifteen hours at about 170° in a closed container. The soda cellulose thus obtained is then washed, bleached with about 7.0% $Cl_2$ in the form of sodium hypochlorite, then washed, freed from acid and again washed. The material is then brought into the form of pasteboard and dried and can then be used directly for the preparation of cellulose solutions or it can first be converted into the cellulose compounds to be brought into solution (cellulose esters or ethers etc.).

In order, for example, to convert the material into viscose it is dipped in excess of sodium hydroxide solution of 18% strength, after which the lye is pressed off until the mass shows three-times the original weight in cellulose. The material saturated with alkali is disintegrated, subjected to the usual prior-ripening medium and then subjected to a sulphidizing by means of carbon disulphide (30%) and is then brought into solution with the aid of sodium hydroxide solution and water. The dissolving process takes place in a perfectly satisfactory manner, the viscose obtained being perfectly clear.

The moulded tissues formed from this viscose are fully equal in value in their properties to the tissues produced from sulfite cellulose according to the same dissolution process.

What I claim and desire to secure by Letters Patent of the United States is:—

1. In a process of manufacturing high grade solutions of cellulosic material from cellulose produced from alkaline pulping processes, separating from raw wood material consisting of a mixture of woods a single wood to obtain one wood completely freed from other woods, thoroughly barking the said wood, reducing the said one wood to pulp in an alkaline medium only, washing the pulp, treating the washed pulp with bleaching material, washing the pulp thus treated by the foregoing procedure, converting the resulting washed cellulosic material directly into a soluble cellulosic substance.

2. In a process of manufacturing high grade solutions of cellulosic material from cellulose produced from alkaline pulping processes, separating one wood from raw wood material containing a mixture of woods, the said one wood being of a group consisting of fir and pine, and thereby obtaining the said one wood completely freed from other woods, thoroughly barking the said one wood, reducing the said one wood to pulp in an alkaline medium only, washing the pulp, treating the washed pulp with bleaching material, washing the pulp thus treated by the foregoing procedure, converting the resulting washed cellulosic material directly into a soluble cellulosic substance.

OTTO FAUST